United States Patent [19]

Uchida

[11] Patent Number: 5,412,692
[45] Date of Patent: May 2, 1995

[54] DATA SLICER

[75] Inventor: Tetsurou Uchida, Hadano, Japan

[73] Assignee: Mitsumi Electric Co., Ltd., Tokyo, Japan

[21] Appl. No.: 97,299

[22] Filed: Jul. 26, 1993

[30] Foreign Application Priority Data

Jul. 27, 1992 [JP] Japan .............................. 4-052611 U

[51] Int. Cl.$^6$ ........................ H04L 25/06; H04L 25/10
[52] U.S. Cl. .................................. 375/317; 375/354;
329/321; 329/350; 327/58; 327/72; 327/310
[58] Field of Search ...................... 375/76, 106, 80, 98;
307/351, 353, 354, 356, 358, 363, 359; 328/150,
169; 329/349, 321, 350; 340/825.7, 825.71,
825.77; 364/724.09; 370/110.3

[56] References Cited

U.S. PATENT DOCUMENTS

| | | | |
|---|---|---|---|
| 4,092,499 | 5/1978 | Lafmark | 340/825.71 |
| 4,554,542 | 11/1985 | Dolikian | 340/825.77 |
| 5,001,726 | 3/1991 | Kawai et al. | 307/358 |
| 5,050,190 | 9/1991 | Shimada et al. | 375/76 |
| 5,052,021 | 9/1991 | Goto et al. | 375/76 |
| 5,179,577 | 1/1993 | Ilyadis | 375/76 |

FOREIGN PATENT DOCUMENTS 377532  8/1991  Japan .

Primary Examiner—Stephen Chin
Assistant Examiner—Amanda T. Le
Attorney, Agent, or Firm—Whitham, Curtis, Whitham & McGinn

[57] ABSTRACT

A data slicer follows abrupt variations in level of the detection signal. The data slicer for converting a detection signal into a digital signal in a data transmission system includes a maximum value detecting section, a minimum value detecting section, a voltage shift-down section, a voltage shift-up section, and a binary encoding circuit. The maximum value detecting section detects the maximum value of the detecting signal, while the minimum value detecting section detects the minimum value of the detecting signal. The voltage shift-down section sets a minimum value which the minimum value detecting section should take according to the output voltage of the maximum value detecting section, while the voltage shift-up section sets a maximum value which the maximum value detecting section should take according to the output voltage of the minimum value detecting section. The binary coding circuit operates to slice the detection signal according to the outputs of the voltage shift-down section and voltage shift-down section, to output serial data sliced.

20 Claims, 6 Drawing Sheets

DATA SLICER

BACKGROUND OF THE INVENTION

1. Field of the invention

This invention relates to a data slicer for converting detection signals into digital signals in a data transmission system.

2. Related art

A data slicer organized as shown in FIG. 1 has been well known in the art. That is, in a synchronization data transmission system, the detection signal is applied through a first low-pass filter 511 to a voltage comparator 512, and the output of the first low-pass filter 511 is applied to a second low-pass filter 513. In the second low-pass filter 513, a reference voltage is formed, and applied to the voltage comparator 512. In the comparator 512, the detection signal received through the first low-pass filter 511 is compared with the reference voltage, to form a digital signal.

In the above-described conventional data slicer, the second low-pass filter 513 detects the maximum voltage value and the minimum voltage value of the detection signal, obtains the average value of those voltage values thus detected, and outputs it as the reference voltage. Hence, the conventional data slicer suffers from a difficulty that the reference value is changed with the variation in frequency of the detection signal.

SUMMARY OF INVENTION

In view of the forgoing problem, a first object of this invention is to provide a data slicer in which the reference voltage is not affected by the variation in frequency of the detection signal.

According to a second object of the present invention is to provide a data slicer which is able to follow abrupt variations in level of the detection signal.

According to a third object of the present invention is to provide a data slicer in which the voltage shift-down section and the voltage shift-up section are free from difficulty that they are adversely affected with the input signals being DC-biased.

In a first aspect of the present invention, there is provided a data slicer which comprises:

a tone decoder for detecting reference data for synchronization from a detection signal to produce a holding instruction signal for a predetermined period of time;

reference voltage value forming means for detecting the maximum voltage value and the minimum voltage value of the detection signal, for calculating the average value of the maximum voltage value and the minimum voltage value, and for outputting the average value corresponding to a reference voltage value;

reference voltage value holding means for holding the reference voltage value provided by the reference voltage forming means while receiving the holding instruction signal from the tone decoder; and voltage comparison means for comparing the detection signal with the reference voltage value held by the reference voltage value holding means, to produce a digital signal.

In a second aspect of the present invention, there is provided a data slicer which comprises:

maximum value detecting means for detecting the maximum value of the detecting signal;

minimum value detecting means for detecting the minimum value of the detecting signal;

voltage shift-down means for setting a minimum value which the minimum value detecting means takes in accordance with an output voltage of the maximum value detecting means;

voltage shift-up means for setting a maximum value which the maximum value detecting means takes in accordance with an output voltage of the minimum value detecting means; and a circuit for slicing the detection signal in accordance with outputs of the voltage shift-up means and voltage shift-down means to output serial data sliced.

In a third aspect of the present invention, there is provided a data slicer which comprises:

maximum value detecting means for detecting the maximum value of the detecting signal;

minimum value detecting means for detecting the minimum value of the detecting signal;

voltage shift-downmeans for setting a minimum value to be taken to the minimum value detecting means in accordance with an output voltage of the maximum value detecting means;

voltage shift-up means for setting a maximum value to be taken to the maximum value detecting means in accordance with an output voltage of the minimum value detecting means; and a circuit for slicing the detection signal in accordance with outputs of the voltage shift-up means and voltage shift-down means to output serial data sliced, wherein said voltage shift-down means includes a first operational amplifier having one input terminal of which is connected to the output terminal of said maximum value detecting means, the voltage shift-up means includes a second operational amplifier having one input terminal of which is connected to the output terminal of the minimum value detecting means and the other input terminals of the first and second operational amplifiers are connected to first and second current mirror circuits, respectively, which are connected to a supply voltage source.

According to the first aspect of the present invention, the reference voltage is not affected by the variation in frequency of the detection signal.

According to the second aspect of the present invention, the voltage shift-down section decreases the output of the maximum value detecting section as much as a predetermined value, to set a false minimum value for the minimum value detecting section, and the voltage shift-up section increases the output of the minimum value detecting section by the predetermined value, to set a false maximum value for the maximum value detecting section.

In the case when the detection signal falls abruptly in level, the output of the maximum value detecting section is applied to the voltage shift-up section; whereas in the case when the detection signal rises abruptly in level, the output of the minimum value detecting section is applied to the voltage shift-down section.

Further, according to the second aspect of the present invention, the data slicer has the voltage shift-down-means and the voltage shift-up means. Hence, even when the detection signal changes abruptly in level, the slicing set voltage can be applied to the binary coding circuit without delay, and therefore, the period of time is shortened by the time from the time instant the detection output is received until the serial data is obtained, and the loss of the serial data is lessened.

According to the third aspect of the present invention, the voltage shift-down means and the voltage shift-up means, having the current mirror circuits, are free from the difficulty that they are adversely affected with the input signals being DC-biased. Thus, the data slicer can provide a slicing voltage at all times the level of which is at the center of the waveform.

DETAILED DESCRIPTION OF THE PREFERRED EMBODIMENTS

Preferred embodiments of the present invention will now be described with reference to the accompanying drawings.

Figure 2:
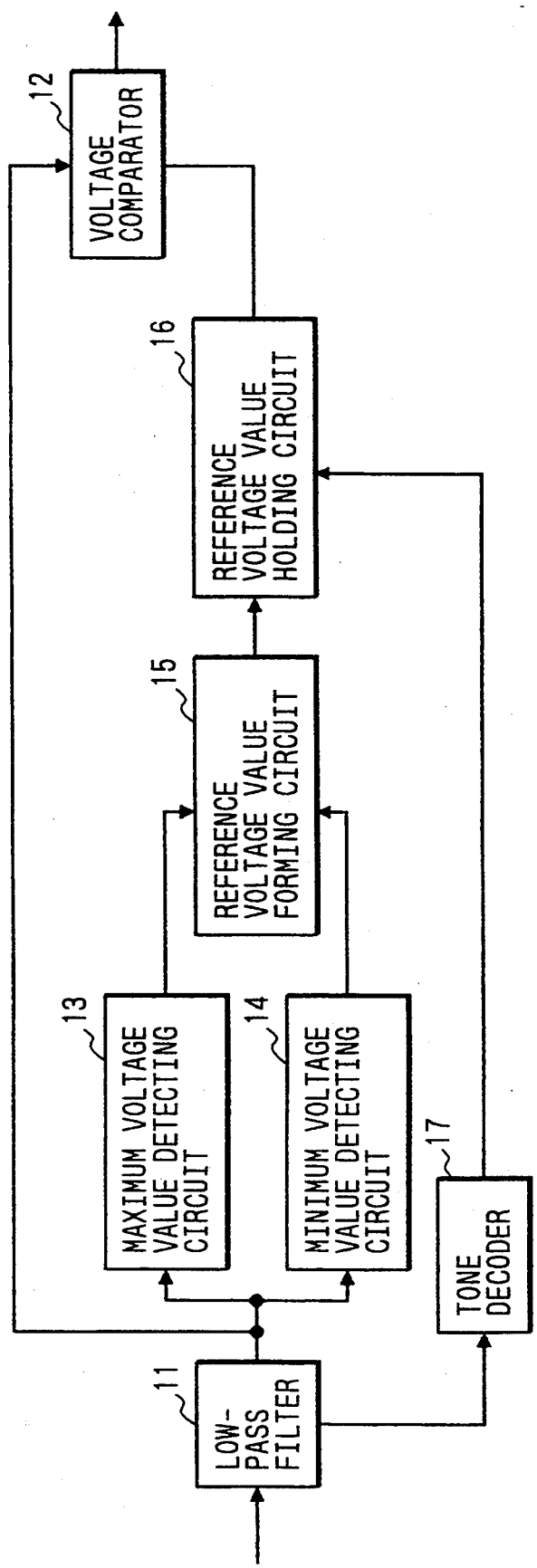
FIG. 2 is a block diagram showing a first embodiment of the present invention.

FIG. 2 shows a first embodiment of the present invention. A reference numeral 11 designates a low-pass filter, which receives a detection signal in a synchronization data transmission system and transmits its low frequency component only. The output signal of the low-pass filter 11 is applied to a voltage comparator 12. The output signal of the low-pass filter 11 is further applied to a maximum voltage value detecting circuit 13 and a minimum voltage value detecting circuit 14. The maximum voltage value detecting circuit 13 is to detect the maximum voltage value of the detection signal passed through the low-pass filter 11, while the minimum voltage value detecting circuit 14 is to detect the minimum voltage value of the detecting signal passed through the low-pass filter 11. The maximum voltage value detected by the maximum voltage value detecting circuit 13, and the minimum voltage value detected by the minimum voltage value detecting circuit 14 are applied to a reference voltage value forming circuit 15. In the reference voltage value forming circuit 15, the average value of the maximum voltage value and the minimum voltage value is calculated. The average value thus calculated is applied to a reference voltage value holding circuit 16.

Figure 1:
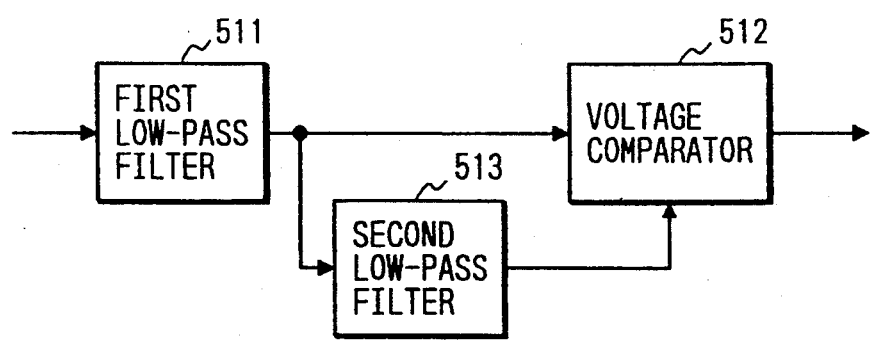
FIG. 1 is a block diagram showing a conventional data slicer.
Figure 3:
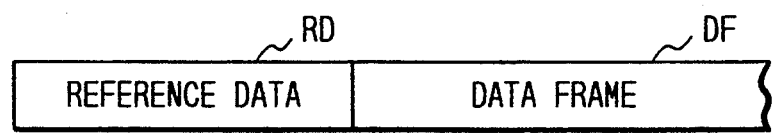
FIG. 3 is an explanatory diagram showing a detection signal in the first embodiment of the present invention.

On the other hand, the output signal of the low-pass filter 11 is applied to a tone decoder 17. In the synchronization data transmission system, the detection signal, as shown in FIG. 3, is made up of reference data RD for synchronization, and a data frame DF succeeding the reference data RD. The tone decoder 17 detects the reference data RD out of the detection signal, and produces a holding instruction signal for a predetermined period of time which is applied to the reference voltage value holding circuit 16. The reference voltage value holding circuit 16 holds the reference voltage value produced by the reference voltage value forming circuit 15 while receiving the holding instruction signal from the tone decoder 17. The voltage comparator 12 compares the detection signal with the reference voltage value held by the reference voltage value holding circuit 16, to produce a digital signal.

The data slicer of the first embodiment of the present invention is advantageous in that the reference voltage is maintained unchanged even when the detection signal varies in frequency; however, it is still disadvantageous in that it cannot follow the abrupt change in level of the detection, because the maximum voltage value detecting circuit 13 and the minimum voltage value detecting circuit 14 includes capacitors. In the case when the detection signal rises abruptly in level, the minimum voltage value detecting circuit 14 can follow this level variation, but the maximum voltage value detecting circuit 13 cannot because the capacitor in it remains charged; whereas in the case when the detection signal falls abruptly in level, the maximum voltage value detecting circuit 13 can follow this level variation, but the minimum voltage value detecting circuit 14 cannot because it takes time to charge the capacitor in it.

In view of the foregoing, the second embodiment of this invention is to provide a data slicer which is able to follow abrupt variations in level of the detection signal.

Figure 4:
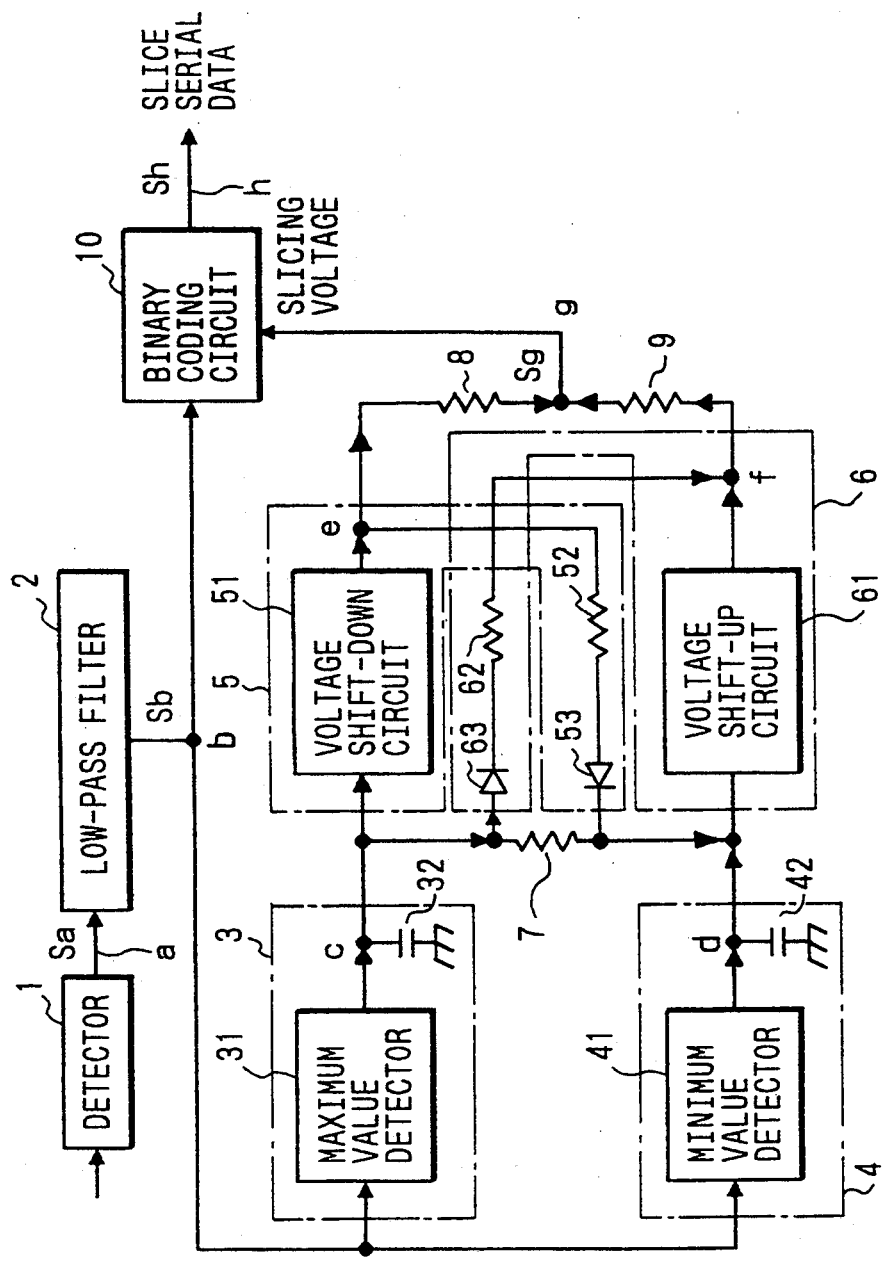
FIG. 4 is a block diagram showing a second embodiment of the present invention.

FIGS. 4 and 5 show the second embodiment of the present invention. The data slicer is organized as shown in FIG. 4. A detector 1 receives a data transmission signal, and outputs a detection signal Sa. A low-pass filter 2 receives the detection signal Sa, and transmits its low frequency component only, thus outputting a filter signal Sb. A maximum value detecting section 3 includes a maximum value detector 31 for detecting the maximum value of the filter signal Sb and a capacitor 32. A minimum value detecting section 4 includes a minimum value detector 41 for detecting the minimum value of the filter signal Sb and a capacitor 42.

A voltage shift-down section 5 comprises: a voltage shift-down circuit 51 connected to the maximum value detecting section 3, and a resistor 52 and a diode 53, through which the output of the voltage shift-down circuit 51 is connected to the minimum value detecting section 4. The voltage shift-down section 5 operates to set a minimum value at the circuit point e which the minimum value detecting section 4 should take according to the output (at the circuit point c) of the maximum value detecting section 3. A voltage shift-up section 6 comprises a voltage shift-up circuit 61 connected to the minimum value detecting section 4; and a resistor 62 and a diode 63 through which the output of the maximum value detecting section 3 is connected to the output of the voltage shift-up circuit 61. The voltage shift-up section 6 operates to set a maximum value at the circuit point f which the maximum value detecting section 3 should take according to the output (at the circuit point d) of the minimum value detecting section 4. The cathode of the diode 53 is connected through a resistor 7 to the anode of the diode 63.

The output of the voltage shift-down section 5 is connected to a resistor 8, while the output of the voltage shift-up section 6 is connected to a resistor 9. The common connecting point of the resistors 8 and 9 is connected to a binary coding circuit 10. The binary coding circuit operates to slice the filter signal of the low-pass filter 2 according to a signal provided at the common connecting point, thereby to output sliced serial data Sh.

The operation of the data slicer thus organized will be described. In the data slicer, the voltage shift-down section 5 decreases the output of the maximum value detecting section 3 by 1 V, to form a false minimum value, whereas the voltage shift-up section 6 increases the output of the minimum value detecting section 4 by 1 V, to form a false maximum value.

Figure 5A:
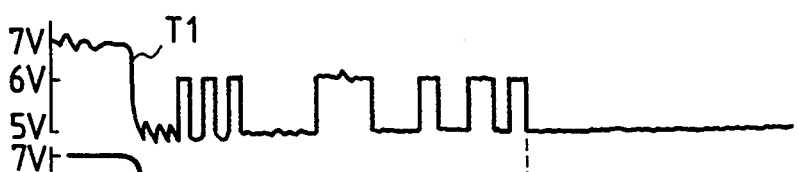
FIGS. 5 (a) to (h) are time charts showing waveforms at various circuit points in the data slicer shown in FIG. 4.

In the case where the detection signal Sa falls abruptly as indicated at T1 in FIG. 5(a), the output voltage of the voltage shift-up circuit 61 is lower than the output voltage of the maximum value detecting section 3, and therefore the capacitor 32 is discharged through the diode 63 and the resistor 62 to the ground of the voltage shift-up circuit 61. As a result, the output voltage of the voltage shift-up section 6 changes according to the abrupt fall of the detection signal Sa. In this operation, signals at various circuits points a to h change as shown in FIGS. 5 (a)–(h), respectively.

Figure 5B:
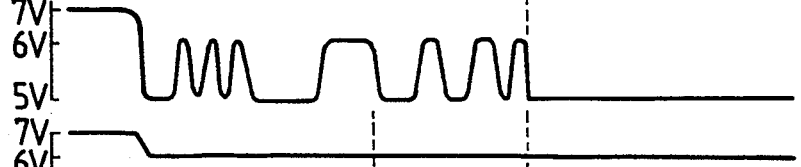
Figure 5C:
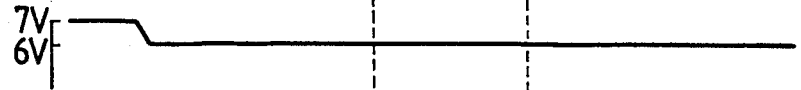

As was described above, when the level of the detection signal Sa falls abruptly (e.g., as shown in FIG. 5(a)), the output voltage of the voltage shift-up section 6 changes following the abrupt fall. This change is supplied, as a slicing set voltage, to the binary coding circuit 10, where the filter signal Sb (e.g., as shown in FIG. 5(b)) is sliced and binary-coded according to the set voltage, thus outputting serial data as shown in FIG. 5 (h).

Figure 5D:
Figure 5E:
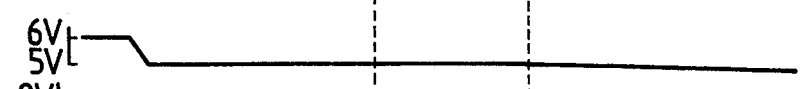
Figure 5F:
Figure 5G:
Figure 5H:

In the case where the detection signal Sa rises abruptly (e.g., as shown in FIG. 5(a)), the output voltage (at the circuit point d as shown in FIG. 5(d)) of the minimum value detecting section 4 is lower than the output voltage (at the circuit point e as shown in FIG. 5(e)) of the voltage shift-down circuit 51, and therefore the capacitor 42 is charged through the resistor 52 and the diode 53 by the output of the voltage shift-down circuit 51. In this case, the capacitor 42 is charged quickly, thus sufficiently following the abrupt rise in level of the detection signal Sa.

Figure 6:
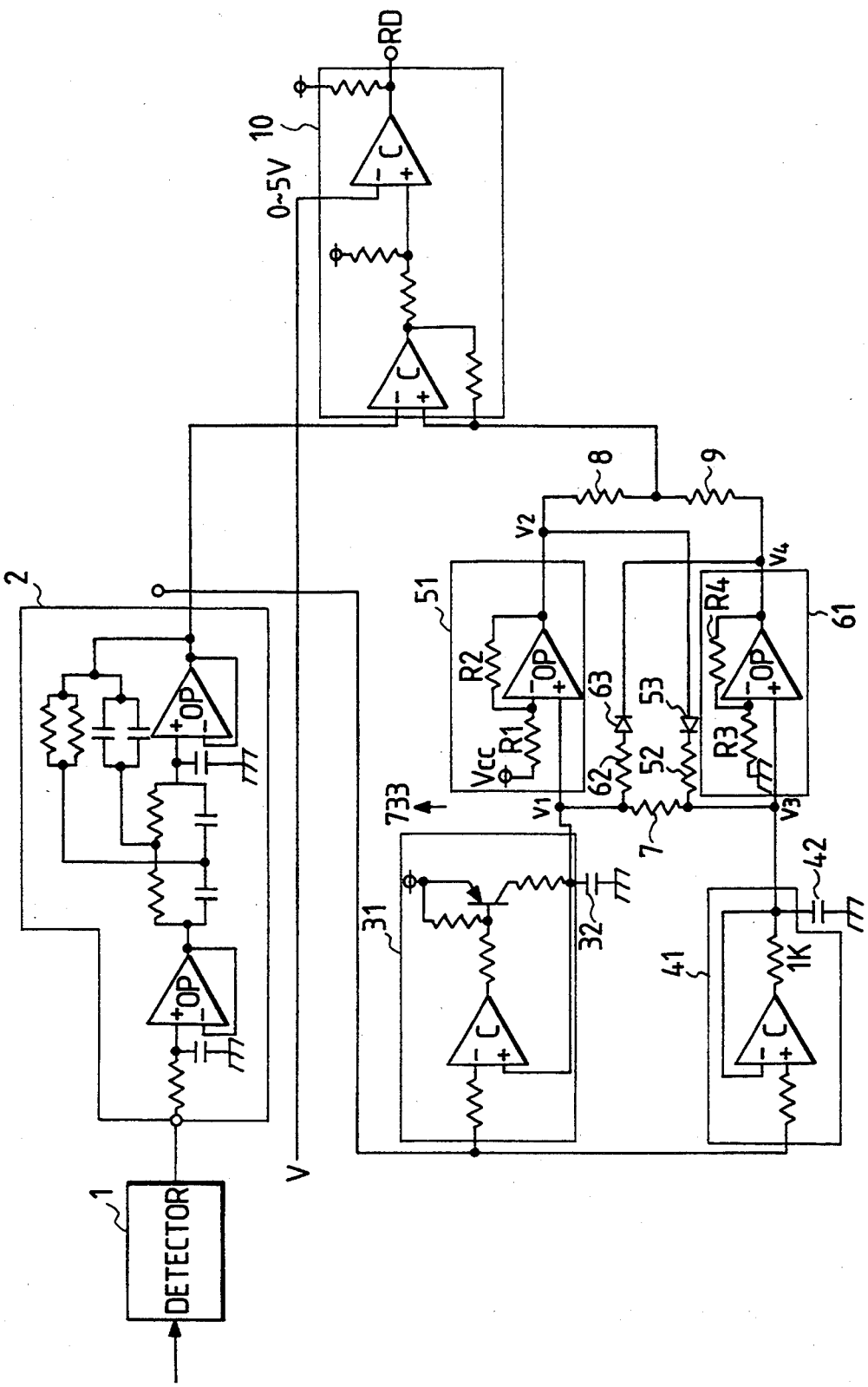
FIG. 6 is a circuit diagram showing a concrete example of the data slicer shown in FIG. 2.

In practice, the voltage shift-down circuit 51 decreases the output voltage of the maximum value detecting section 3 as much as $(1+\alpha)$ V (where $\alpha$ is less than one (1)), and the voltage shift-up circuit 61 increases the output voltage of the minimum value detecting section 4 as much as $(1+\alpha)$ V. This is to eliminate a difficulty that, if the shift-up value or shift-down value is set to 1 V, then in the ordinary signal reception the voltage shift-down circuit 51 and the voltage shift-up circuit 61 act on the capacitors 32 and 34. Setting the shift-up and shift-down values to $(1+\alpha)$ V as was described above is advantageous in the following point: When the detection signal changes abruptly in level, the maximum and minimum values (the amounts of charge of the capacitors 32 and 42) are shifted as much as $+\alpha$ V. However, the resistor 7 acts to discharge the capacitors 32 and 42 gradually, thus consuming the energy of $\alpha$ V. Therefore, the central value of the filter signal Sb can be detected as a signal Sg. FIG. 6 shows a concrete example of the circuit of FIG. 4.

The data slicer of the second embodiment of the present invention suffers from the following difficulty: In the data slicer, the voltage shift-down circuit 51 and the voltage shift-up circuit 61 operate as DC offset circuits; however, the off-set values thereof are changed with input signals from the maximum value detecting section 3 and the minimum value detecting section 4 being DC-biased, and the slice level is therefore shifted from the center of the waveform. This will be described in more detail.

It is assumed that the input voltages and the output voltages of the voltage shift-down circuit 51 and the voltage shift-up circuit 61 and the various resistors have values as indicated in FIG. 6. Then, the following Equations (1) and (2) are established for the voltage shift-down circuit 51 and the voltage shift-up circuit 61, respectively:

$$(V_{cc} - v_1)/R1 = (v_1 - v_s)/R2 \quad \text{---} \quad (1)$$

$$(0 - V_s)/R3 = (v_3 - v_4)/R4 \quad \text{---} \quad (2)$$

With $(v_1 - v_2) = \Delta V_D$ and $(v_4 - v_3) = \Delta V_U$, $\Delta V_D$ and $\Delta V_U$ can be represented by the following Equations (3) and (4), respectively:

$$\Delta V_D R2(V_{cc} - v_1)/R1 \quad \text{---} \quad (3)$$

$$\Delta V_U = R4\, v_3/R3 \quad \text{---} \quad (4)$$

In the case where voltages applied as $v_1$ and $v_3$ are signals the central level of which is a voltage $V_{cc}/2$, with $v_1 = (V_{cc} + V_s)/2$ and $v_3 = (V_{cc} - V_s)/2$ $\Delta V_D$ and $\Delta V_U$ can be represented by the following Equations (5) and (6):

$$\begin{aligned}\Delta V_D &= R2\{V_{cc} - (V_{cc} + V_s)/2\}/R1 \\ &= R2(V_{cc} - V_s)/(R1\,2)\end{aligned} \quad (5)$$

$$\Delta V_U = R4(V_{cc} - V_s)/(R3\,2) \quad (6)$$

Hence, if it is assumed that $R1 = R3$, and $R2 = R4$, then both $\Delta V_D$ and $\Delta V_U$ can be represented by Equation (5). Therefore, if the voltages $v_1$ and $v_3$ are signals whose central level is $V_{cc}/2$, then the shift voltages become equal.

Let us consider the case where the central voltage is shifted by $V_e$. If, in this case, $v_1$ and $v_3$ are represented by the following Equations (7) and (8), respectively, then $\Delta V_D$ and $\Delta V_U$ can be represented by the following Equations (9) and (10), respectively:

$$v_1 = (V_{cc} + V_s)/2 + V_e \quad \text{---} \quad (7)$$

$$v_3 = (V_{cc} - V_s)/2 + V_e \quad \text{---} \quad (8)$$

$$\begin{aligned}\Delta V_D &= (R2/R1)[V_{cc} - \{(V_{cc} + V_s)/2 + V_e\}] \\ &= (R2/R1)\{(V_{cc} - V_s)/2\} - (R2/R1)V_e\end{aligned} \quad (9)$$

$$\begin{aligned}\Delta V_U &= (R4/R3)\{(V_{cc} + V_s)/2 + V_e\} \\ &= (R4/R3)\{(V_{cc} - V_s)/2\} + (R4/R3)V_e\end{aligned} \quad (10)$$

Hence, when $R1 = R3$, and $R2 = R4$, an error voltage represented by the following Equation (11) is formed as the difference between $\Delta V_D$ and $\Delta V_U$. Therefore, when the center of the signal voltages is shifted, then the shift voltage involves an error.

$$\begin{aligned}\Delta V_D - \Delta V_U &= (R4/R3)V_e + (R2/R1)V_e \\ &= 2(R2/R1)V_e\end{aligned} \quad (11)$$

In view of the foregoing, a third embodiment of the present invention is to provide a data slicer in which the voltage shift-down section and the voltage shift-up section are free from difficulty that they are adversely affected with the input signals being DC-biased.

Figure 7:
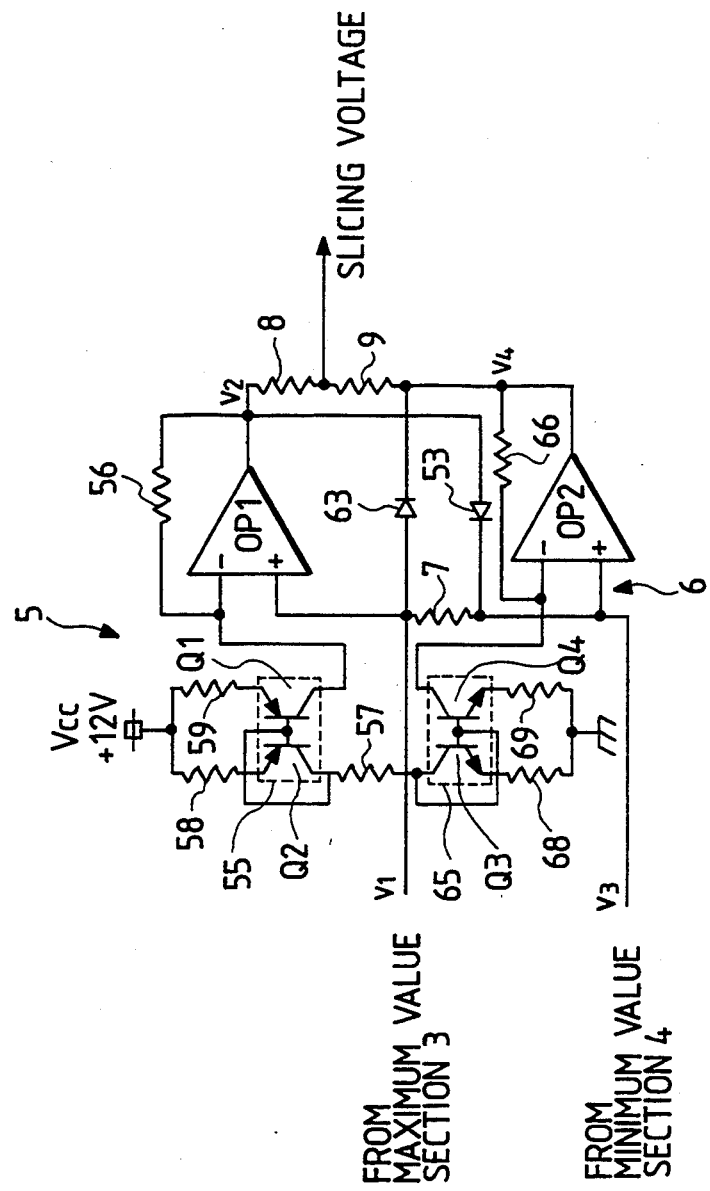
FIG. 7 is a circuit diagram showing essential parts of one example of a data slicer, which constitutes a third embodiment of the present invention.

A data slicer, which constitutes a third embodiment of this invention, will be described with reference to FIG. 7. FIG. 7 shows a voltage shift-down section and a voltage shift-up section in the data slicer which correspond to the sections 5 and 6 shown in FIG. 4. In FIG. 7, parts corresponding functionally to those which have been described with reference to FIG. 4 are therefore designated by the same reference numerals or characters.

In the data slicer of the invention, a voltage shift-down circuit 51 comprises: a current mirror circuit 55 made up of transistors Q1 and Q2 which are connected to a supply voltage source $V_{cc}$ (+12 V); a resistor 56; and an operational amplifier OP1, the input terminals of which are connected to the output of the maximum value detecting section 3 and the output of the current mirror circuit 55, respectively. A voltage shift-up circuit 61 comprises: a current mirror circuit 65 made up of transistors Q3 and Q4 which is connected to the current mirror circuit 55; a resistor 66; and an operational amplifier OP2, the input terminals of which are connected to the output of the minimum value detecting section 4 and the output of the current mirror circuit 65, respectively.

Therefore, even when the input signals from the maximum value detecting section 3 and the minimum value detecting section 4 are varied by being DC-biased, with respect to input voltages of from 5 to 10 V a constant offset voltage (1.5 V) is provided as a slicing voltage owing to the current mirror effect of the transistors Q1 and Q4 on the current which flows from the supply voltage source $V_{cc}$ (+12 V) through the resistor 58, the transistor Q2, the resistor 57, the transistor Q3, the resistor 68 to ground. It should be noted that the offset voltage can be set optionally by adjusting the resistance of the resistor 57.

The operation of the data slicer will be described in more detail.

It is assumed that, in FIG. 7, the input voltage and the output voltage of the voltage shift-down circuit are represented by $v_1$ and $v_2$, respectively; the input voltage and the output voltage of the voltage shift-up circuit, $v_3$ and $v_4$; the resistances of the resistors 56, 58, 59, 66, 68 and 69, R56, R58, R59, R66, R68 and R69, respectively; and the value of a current flowing in the resistor 57, I57. In addition, it is assumed that the base-emitter voltages of the transistors Q1, Q2, Q3 and Q4 are represented by $V_{BE1}$, $V_{BE2}$, $V_{BE3}$ and $V_{BE4}$, respectively. Then, the supply voltage $V_{cc}$, and the current I57 flowing in the resistor 57 can be represented by the following Equations (12) and (13), respectively:

$$V_{cc} = R58 \cdot I57 + V_{BE2} + R57 \cdot I57 + V_{BE3} + R68 \cdot I57$$
$$= (R58 + R57 + R68) \cdot I57 + V_{BE2} + V_{BE3} \quad (12)$$

$$I57 = \{V_{cc} - (V_{BE2} + V_{BE3})\}/(R58 + R57 + R68) \quad (13)$$

If it is assumed that currents flowing in the resistors 59 and 69 are represented by I59 and I69, respectively, then the following relations (14), (15) and (16) are established:

$$I59 \cdot R59 + V_{BE1} = V_{cc} - (R57 \cdot I57 + V_{BE3} + R68 \cdot I57) \quad (14)$$

$$I59 \cdot R59 + V_{BE1} = (R58 + R57 + R68) \cdot I57 + V_{BE2} + V_{BE3} - \{(R57 + R68) \cdot I57 + V_{BE3}\}$$
$$= R58 \cdot I57 + V_{BE2} \quad (15)$$

$$I59 = (R58 \cdot I57 + V_{BE2} - V_{BE1})/R59 \quad (16)$$

Let us consider that $V_{BE1}$ and $V_{BE2}$ are substantially equal to each other, and $V_{BE3}$ and $V_{BE4}$ are also substantially equal to each other. In this case, the current values I56 and I69 can be represented by the following Equations (17) and (18), respectively:

$$I59 = (R58/R59) \cdot I57 \quad (17)$$

$$I69 = (R68/R69) \cdot I57 \quad (18)$$

When the voltages $v_1$ and $v_2$ are within the base voltages of the transistors, then $\Delta V_D$ and $\Delta V_U$ can be represented by the following Equations (19) and (20), respectively:

$$\Delta V_D = v_1 - v_2$$
$$= I59 \cdot R68$$
$$= (R58/R59) \cdot I57 \cdot R58 \quad (19)$$

$$\Delta V_U = v_4 - v_3$$
$$= I69 \cdot R66$$
$$= (R68/R69) \cdot I57 \cdot R66 \quad (20)$$

Therefore, when R59=R58=R68=R69, and R56=R66, the relation between $\Delta V_D$ and $\Delta V_U$ is represented by the following Equation (21):

$$\Delta V_D = \Delta V_U = (R58/R59) \cdot I57 \cdot R56 \quad (21)$$

That is, it can be understood that the voltage shift is constant irrespective of the input voltages.

As was described above, in the data slicer of the third embodiment of the present invention, the voltage shift-down section and the voltage shift-up section, having the current mirror circuits, are free from the difficulty that they are adversely affected with the input signals being DC-based. Thus, the data slicer can provide a slicing voltage at all times the level of which is at the center of the waveform.

What is claimed is:

1. A data slicer comprising:
   maximum value detecting means for detecting a maximum value of a detection signal;
   minimum value detecting means for detecting a minimum value of the detection signal;
   voltage shift-down means for setting a minimum value to be taken by the minimum value detecting means in accordance with an output voltage of the maximum value detecting means;
   voltage shift-up means for setting a maximum value to be taken by the maximum value detecting means in accordance with an output voltage of the minimum value detecting means; and
   a circuit for slicing the detection signal in accordance with outputs of the voltage shift-up means and voltage shift-down means to output sliced serial data.

2. A data slicer as claimed in claim 1, wherein said voltage shift-down means includes a first operational amplifier having one input terminal which is connected to an output terminal of said maximum value detecting means, the voltage shift-up means includes a second operational amplifier having one input terminal which is connected to an output terminal of the minimum value detecting means and the other input terminals of the first and second operational amplifiers are connected to first and second current mirror circuits, respectively, which are connected to a voltage supply source.

3. A data slicer as claimed in claim 2, wherein an output signal of the voltage shift-down means has a magnitude in predetermined voltage lower than that of an output of the maximum value detecting means and an output signal of the voltage shift-up means has a magnitude in predetermined voltage higher than that of an output of the minimum value detecting means.

4. A data slicer as claimed in claim 2, wherein said maximum value detecting means includes a first capacitor and said minimum value detecting means includes a second capacitor.

5. A data slicer as claimed in claim 2, wherein said voltage shift-down means includes a first resistor and a first diode through which an output of said voltage shift-down means is coupled to said minimum value detecting means and said voltage shift-up means includes a second resistor and a second diode through which an output of said voltage shift-up means is coupled to said maximum value detecting means.

6. A data slicer as claimed in claim 5, further comprising a third resistor, wherein a cathode of said first diode is connected through said third resistor to an anode of said second diode.

7. A data slicer as claimed in claim 6, further comprising a fourth resistor and a fifth resistor, wherein the output of said voltage shift-down means is coupled to said fourth resistor and the output of said voltage shift-up means is coupled to said fifth resistor.

8. A data slicer as claimed in claim 7, wherein a common connecting point of said fourth and fifth resistors is coupled to said circuit.

9. A data slicer as claimed in claim 8, wherein said circuit includes means for slicing the detection signal according to a signal provided at said common connecting point, thereby to output said sliced serial data.

10. A data slicer according to claim 2, wherein said first current mirror circuit comprises first and second transistors, a first resistor and said first operational amplifier, and wherein said second current mirror circuit comprises third and fourth transistors, a second resistor and said second operational amplifier.

11. A data slicer as claimed in claim 1, wherein an output signal of the voltage shift-down means has a magnitude in predetermined voltage lower than that of an output of the maximum value detecting means and an output signal of the voltage shift-up means has a magnitude in predetermined voltage higher than that of an output of the minimum value detecting means.

12. A data slicer as claimed in claim 1, wherein said maximum value detecting means includes a first capacitor and said minimum value detecting means includes a second capacitor.

13. A data slicer as claimed in claim 1, wherein said voltage shift-down means includes a first resistor and a first diode through which an output of said voltage shift-down means is coupled to said minimum value detecting means and said voltage shift-up means includes a second resistor and a second diode through which an output of said voltage shift-up means is coupled to said maximum value detecting means.

14. A data slicer as claimed in claim 13, further comprising a third resistor, wherein a cathode of said first diode is connected through said third resistor to an anode of said second diode.

15. A data slicer as claimed in claim 14, further comprising a fourth resistor and a fifth resistor, wherein the output of said voltage shift-down means is coupled to said fourth resistor and the output of said voltage shift-up means is coupled to said fifth resistor.

16. A data slicer according to claim 1, wherein a slice level of said detection signal by said circuit for slicing is determined in accordance with an input waveform.

17. A data slicer according to claim 1, wherein a slice level of said detection signal by said circuit for slicing is determined solely in accordance with an input waveform, said sliced serial data output from said circuit for slicing being devoid of any connection back to any of said maximum value detecting means, said minimum value detecting means, said voltage shift-down means and said voltage shift-up means.

18. An apparatus for converting a detection signal into a digital signal, comprising:
  a tone decoder for receiving a detection signal and for detecting reference data for synchronization from said detection signal to produce a holding instruction signal for a predetermined period of time;
  reference voltage value forming means for detecting a maximum voltage value and a minimum voltage value of the detection signal, for calculating an average value of the maximum voltage value and the minimum voltage value, and for outputting the average value corresponding to a reference voltage value;
  reference voltage value holding means for receiving and holding the reference voltage value from the reference voltage forming means while receiving the holding instruction signal from the tone decoder; and
  voltage comparison means for comparing the detection signal with the reference voltage value held by the reference voltage value holding means to produce a digital signal.

19. An apparatus according to claim 18, wherein said maximum value detecting means includes a first capacitor and said minimum value detecting means includes a second capacitor.

20. An apparatus according to claim 18, further comprising a low-pass filter, said low-pass filter outputting said detection signal to said tone decoder, said detection signal including said reference data and a data frame succeeding said reference data.

* * * * *